United States Patent [19]

Nozawa et al.

[11] 4,300,668
[45] Nov. 17, 1981

[54] SYNCHROMESH DEVICE FOR A TRANSMISSION OF AN INDUSTRIAL TRUCK

[75] Inventors: Koji Nozawa, Higashikurume; Norio Takegami, Hamamatsu; Yukio Mizukoshi, Yokohama; Mitsuo Ikkatai, Ohme, all of Japan

[73] Assignee: Nissan Motor Co., Ltd., Yokohama, Japan

[21] Appl. No.: 57,849

[22] Filed: Jul. 16, 1979

[30] Foreign Application Priority Data

Jul. 20, 1978 [JP] Japan .................................. 53/87743

[51] Int. Cl.³ .............................................. F16D 23/06
[52] U.S. Cl. .................................. 192/53 F; 74/339
[58] Field of Search ..................... 74/339; 192/53 F

[56] References Cited

U.S. PATENT DOCUMENTS

| | | | |
|---|---|---|---|
| 2,087,070 | 7/1937 | Reggio | 192/53 F |
| 2,267,452 | 12/1941 | Fishburn | 192/53 F |
| 2,333,165 | 11/1943 | Fishburn | 192/53 F |
| 2,788,874 | 4/1957 | Forster | 74/339 X |
| 2,981,390 | 4/1961 | Doerper | 74/339 X |
| 3,861,509 | 1/1975 | Inove et al. | 192/53 F |
| 4,189,041 | 2/1980 | Müller | 192/53 F |

*Primary Examiner*—Allan D. Herrmann
*Attorney, Agent, or Firm*—Thompson, Birch, Gauthier & Samuels

[57] ABSTRACT

A synchromesh device for a transmission of an industrial truck such as a fork lift truck includes a main shaft, forward and reverse change gears, synchronizing hub fixed to the main shaft by means of spline grooves, a coupling sleeve axially slidably engaged with spline grooves formed in the outer circumference of the synchronizing hub, and balk-rings formed in their inner surfaces with conical surfaces facing to conical surfaces formed in the side of a clutch gear integral with the forward change gear and of a clutch gear integral with the reverse change gear, respectively.

According to the invention, conical angles of the conical surfaces are more than 10° and preferably less than 11°, thereby reducing surface pressures acting between the synchronizing slide surfaces during the synchronization to improve the durability remarkably.

1 Claim, 3 Drawing Figures

Durability (Number of Synchromeshed Times)

SYNCHROMESH DEVICE FOR A TRANSMISSION OF AN INDUSTRIAL TRUCK

BACKGROUND OF THE INVENTION

1. Field of the Invention

The present invention relates to a synchromesh device for use in transmissions of industrial trucks, particularly fork lift trucks for transferring heavy loads.

2. Description of the Prior Art

In industrial trucks such as fork lift trucks, frequent forward and reverse changings are needed for their working purposes. Accordingly, synchromesh devices for forward and reverse changing are required to be highly durable.

In synchromesh devices for forward and reverse changing hitherto used, conical angles of synchronizing slide surfaces are about 6° which would provide high surface pressures between the synchronizing slide surfaces during synchronization to obtain large synchronizing capacities. As the result, the slide surfaces subjected to the high pressures would be considerably worn off. Forward and reverse gears are rotated in relatively opposite directions, so that the synchronization for forward and reverse changing is carried out between the synchronizing slide surfaces rotating at a remarkably high relative rotating speed, with result that the slide surfaces are greatly worn off unavoidably requiring often replacements of the synchromesh devices.

SUMMARY OF THE INVENTION

With fork lift trucks and the like, because of their heavy total weights, a somewhat longer period of time (2-3 seconds) is required from braking to stoppage for changing forward and reverse movements even if a travelling speed is relatively low. Accordingly, it is not necessarily needed for industrial trucks to have a large synchronizing capacity for completing the synchronization for a short period of time (0.3 second).

In view of this, it is a principal object of the invention to provide a synchromesh device for forward and reverse changing, which is suitable for industrial trucks such as fork lift trucks.

It is a further object of the invention to provide an improved synchromesh device for a transmission of an industrial truck, whose synchronizing slide surfaces include conical angles more than 10° to reduce surface pressures acting between the synchronizing slide surfaces during the synchronization, thereby remarkably improving its durability.

The invention will be more fully understood by referring to the following detailed specification and claims taken in connection with the appended drawings.

DETAILED DESCRIPTION OF THE PREFERRED EMBODIMENT

Figure 1:
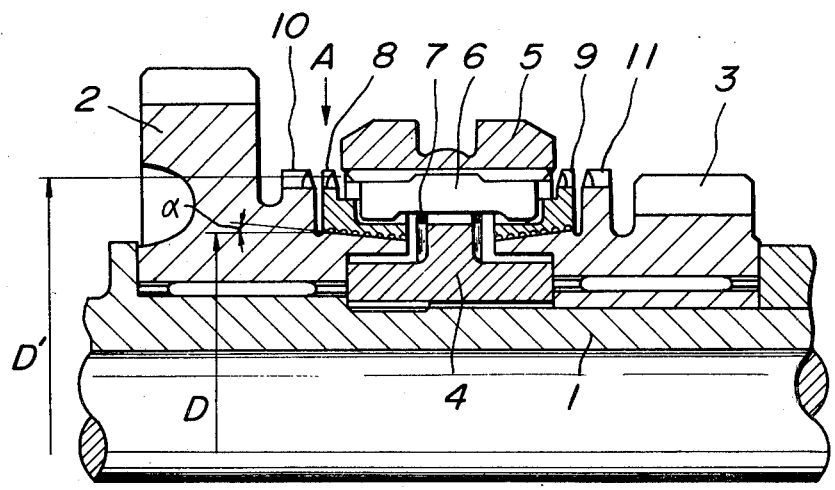
FIG. 1 is a sectional view of a synchromesh device according to the invention.

Referring to FIG. 1 illustrating a synchromesh device for forward and reverse change gears according to the invention, the device comprises a main shaft 1, a forward change gear 2, a reverse change gear 3 and a synchronizing hub 4 fixed to the main shaft 1 by means of spline grooves.

A coupling sleeve 5 is axially slidably engaged with spline grooves formed in the outer circumference of the synchronizing hub 4. The synchronizing hub 4 is also formed in its circumference with notches for accommodating therein respective insert keys 6 adapted to be urged radially outwardly by means of spread springs in the form of a ring 7 to be forced into grooves formed in the inner surface of the coupling sleeve 5 at the mid portion between the ends thereof.

Balk-rings 8 and 9 are formed in their inner surfaces with conical surfaces facing conical surfaces formed in the sides of a clutch gear 10 integral with the forward change gear 2 and of a clutch gear 11 integral with the reverse change gear 3, respectively. The bulk-rings 8 and 9 are also formed in their side surfaces with notches for receiving the insert keys 6.

With this arrangement, when the coupling sleeve 5 is moved, for example, toward the forward change gear 2 by means of a shift fork (not shown), the insert keys 6 are moved together with the coupling sleeve 5 with the aid of the spread springs 7, so that the end faces of the insert keys 6 urge the balk-ring 8 to bring its conical surface into contact with the conical surface of the forward change gear 10. When the rotating speed of the coupling sleeve 5 becomes equal to that of the forward change gear 2 in the manner according to the publicly known synchronizing function, the coupling sleeve 5 pushes the insert keys 6 inwardly and engages the splines in the outer surface of the balk-ring 8 and the clutch gear 10, thereby transmitting the driving power from the main shaft 1 driven by a power source (not shown) through the synchronizing hub 4 and the coupling sleeve 5 to the forward change gear 2.

According to the invention, angles of more than 10° are employed for the conical angles α of the conical surface of the balk-rings 8 and 9 and the change gears 2 and 3, which form the synchronizing slide surfaces.

In such a synchromesh device, the synchronizing function is effected by the contact frictional force between the conical surfaces. If the conical angle α is small, the conical contact surfaces would be subjected to an excess surface pressure resulting from a shifting load, so that the conical surfaces are apt to be worn off to become poor in durability. The larger the angle α of the conical surfaces, the less the contact surface pressure.

Figure 2:
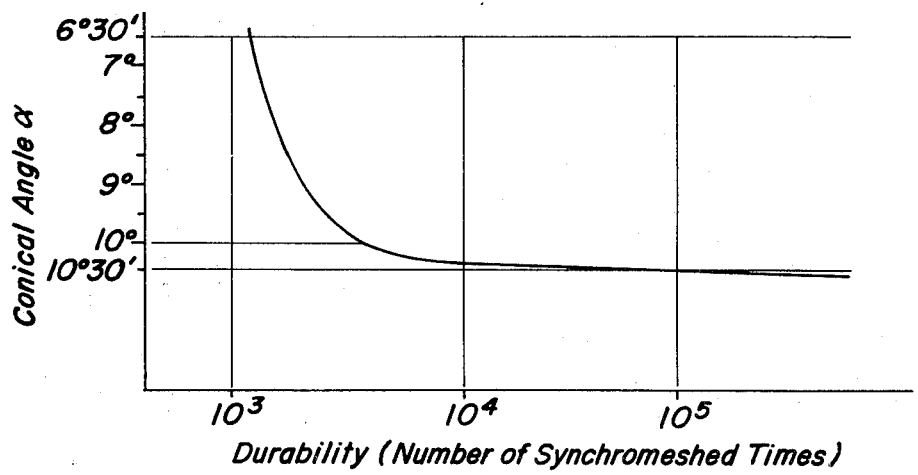
FIG. 2 is a graph illustrating a relation between conical angles of synchronizing slide surfaces and durabilities.

It has been found in the inventors' experiments that the relation between the conical angles α and durabilities of the device can be shown as in a curve in FIG. 2 wherein the durability rapidly increases within a range more than 10° of the conical angle. The durability in this case is defined by numbers of synchromeshed times until the conical surface of the balk-ring has been worn off to an extent that the clearance between the clutch gear and balk-ring is eliminated because the more the conical surface wears, the more the end of the balk-ring approaches the end of the change gear.

For example, in comparison of the conical surfaces of 10°30′ with 6°30′, the former is of 35–40% of the latter in contact surface pressure an PV valve (product of contact surface pressure and sliding movement speed). The durability or number of synchromeshed times of the former is 100 times longer than that of the latter. In other words, it is clearly evident that the wear resistance of the conical surface having a conical angle more than 10° is remarkably improved.

A synchronizing capacity of a synchromesh device is given by $\mu D/(2\cdot\sin\alpha)$, where $\mu$ is a coefficient of friction and D is an effective diameter of a conical surface. As can be seen from the relation, the larger the conical angle $\alpha$, the less the synchronizing capacity and thus the longer the time required for the synchronizing operation. A time required for a synchronizing operation with a conical angle 6°30° is 0.3 second, while a time with an angle 10°30′ is 0.6 second. Such a difference in short time does not give rise to any problem in a practical use of a fork lift truck and the like.

Figure 3:
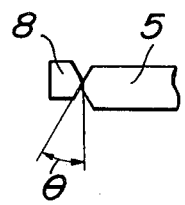
FIG. 3 is a diagrammatical plan view of the balk-ring as viewed in the direction of the arrow A in FIG. 1, for explaining the chamfer angle of the balk-ring.

Synchronizing conditions are indicated by the following formula.

$$\mu K/\sin \alpha \geqq \tan (\theta - e')$$

where $K=D/D'$; $D'$=average diameter of chamfer of balk-ring
 $\theta$=chamber angle of balk-ring (refer to FIG. 3) and $e'=\tan \mu'$; $\mu'$=coefficient of friction of chamfer.

Accordingly, it is of course preferable to make small the chamfer angle $\theta$ thereby preventing a slip due to a reduced surface pressure. However, an excessively increased conical angle may give rise to a problem in synchronizing capacity and the like. In view of this, the conical angle less than 11° is preferable in the practical use.

As can be seen from the above description, according to the invention the conical angle of the synchronizing slide surface of the synchromesh device is made more than 10° to reduce the contact surface pressure resulting in the small PV value, thereby remarkably improving the durability required in industrial trucks such as fork lift trucks which frequently need the forward and reverse changing. In order to improve the wear-resistance of the conical surface of the balk-ring, the molybdenum spraying process has generally been used. The device according to the invention can dispense with the coating by such a process, as the case may be. Moreover, the device according to the invention ensures the sufficient synchronizing performance in practical use because the industrial trucks need not shorten the synchronizing period of time which are different from passenger cars.

While the invention has been particularly shown and described with reference to preferred embodiments thereof, it will be understood by those skilled in the art that the foregoing and other changes in form and details can be made therein without departing from the spirit and scope of the invention.

What is claimed is:

1. In a synchromesh device for a transmission of an industrial truck including conical synchronizing slide surfaces whose contact frictional force performs a synchronizing operation, the improvement comprising the conical surfaces including conical angles of more than 10° but less than 11°.

* * * * *